United States Patent [19]

Shainberg et al.

[11] 3,961,547

[45] June 8, 1976

[54] PAPER SCORING AND SLITTING MACHINE

[76] Inventors: Maurice Shainberg, 22J Amberly Drive, Englishtown, N.J. 07726; Joseph Purcell, 49 Kaurik St., Little Ferry, N.J. 07643

[22] Filed: Nov. 20, 1974

[21] Appl. No.: 525,350

[52] U.S. Cl. ............................. 83/11; 74/424.8 A; 83/12; 83/408; 83/425.4; 83/433; 83/479
[51] Int. Cl.² .......................................... B26D 3/08
[58] Field of Search ................... 83/11, 12, 51, 407, 83/408, 425.4, 433–479, 498, 499, 504, 507, 516, 528, 559, 577, 665, 482; 74/424.8 A

[56] References Cited
UNITED STATES PATENTS

| | | | |
|---|---|---|---|
| 1,642,081 | 9/1927 | Munroe | 83/407 X |
| 2,776,710 | 1/1957 | Homery et al. | 83/499 X |
| 3,235,220 | 2/1966 | Rantsch | 74/424.8 A X |
| 3,408,886 | 11/1968 | David | 83/479 X |
| 3,540,340 | 11/1970 | Koskela | 83/499 |
| 3,646,418 | 2/1972 | Sterns et al. | 83/11 X |
| 3,733,914 | 5/1973 | Sheesley | 74/424.8 A X |
| 3,786,705 | 1/1974 | Dorfel | 83/504 X |

*Primary Examiner*—Othell M. Simpson
*Assistant Examiner*—Fred A. Silverberg
*Attorney, Agent, or Firm*—Albert F. Kronman

[57] ABSTRACT

A machine for continuously scoring and slitting paper, such as corrugated board and the like and for changing the pattern of cuts and scores while the paper is in motion. Two sets of scoring and slitting rollers having a plurality of scoring and slitting assemblies thereon are used, only one of which is in use at any time. The inactive set of rollers can be adjusted and secured in a new cutting pattern while the other set is operating. The scoring and slitting assemblies on the rollers are moved into position by a common threaded rod. Each roller, scoring or slitting assembly, is provided with a split nut and an electrically controlled clutch which is used to engage the nuts and to move the roller assemblies selectively along the threaded rod to a desired cutting position.

1 Claim, 7 Drawing Figures

2

PAPER SCORING AND SLITTING MACHINE

BACKGROUND OF THE INVENTION

The present invention relates to improvements in slitting and scoring machines for strip or sheet products delivered from a storage role or large stack of sheets. The invention has particular reference to the corrugated board industry and is used to score and slit such boards into shapes for conversion into shipping containers.

Prior scoring and slitting machines, using only one set of cutters and scoring rollers required a complete shutdown when changing patterns. This caused considerable waste of paper board, lost time, and a reduction in the production schedule. The present invention provides an immediate changeover from one pattern to another without stopping the movement of the paper from its storage roll. The invention also provides a control system which may be operated at a distance from the machine and does not require an operator's presence at or under the cutter rollers when they are being adjusted and secured in a new position.

SUMMARY

The invention comprises a paper scoring and slitting machine and includes a first plurality of rotary knives and scoring wheels mounted on cross shafts for slitting and scoring the paper. A second plurality of rotary knives and scoring wheels, spaced from the first along the line of travel of the paper, is arranged for producing an alternate pattern of slits and score marks. Supporting cross shafts provide a mounting for each of the sets of scoring and cutting wheels and an elongated threaded cross rod is mounted in parallel alignment with the supporting cross shafts. The threaded rod is used for selectively moving the rotary knives and scoring wheels to a desired position when the knives and wheels are not in contact with the paper. A plurality of split nuts are coupled to the knives and scoring wheels for engaging threads on the threaded cross rod and for moving the knives and scoring wheels transversely to predetermined positions when the threaded rod is rotated. The knives and scoring wheels are anchored in place when the threaded rod is held from rotation.

The invention also comprises a control circuit for operating the split nuts to mesh with the threads on the threaded rod or to be disengaged therefrom. The control circuit includes relays and contact keys for operating solenoid coils coupled to the split nuts. In addition, pistons operating in pneumatic cylinders are controlled by electrically operated valves to move one set of knives into contact with the paper while the other set of knives is disengaged for lateral adjustment.

Additional details of the invention will be disclosed in the following description, taken in connection with the accompanying drawings.

DESCRIPTION OF THE PREFERRED EMBODIMENT

Figure 1:
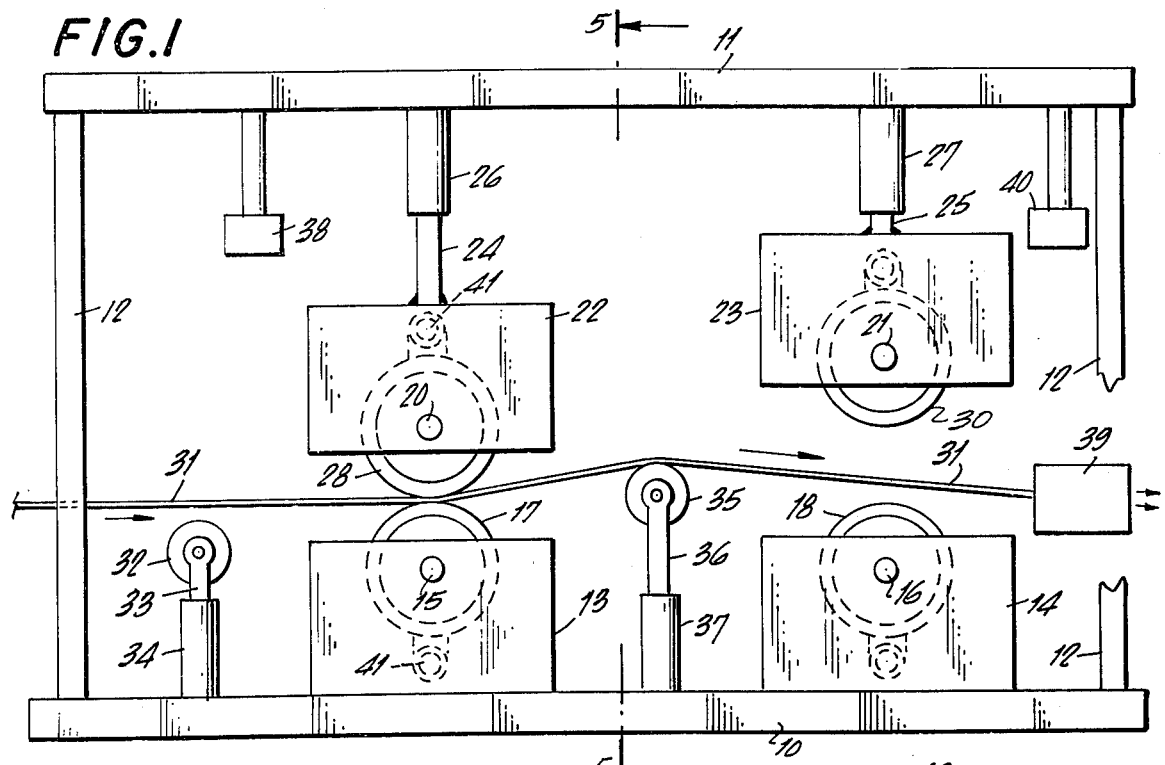
FIG. 1 is a side view of the machine, showing one set of knives and scoring wheels in contact with the paper while a second set is in disengaged and in the adjustable position.
Figure 5:
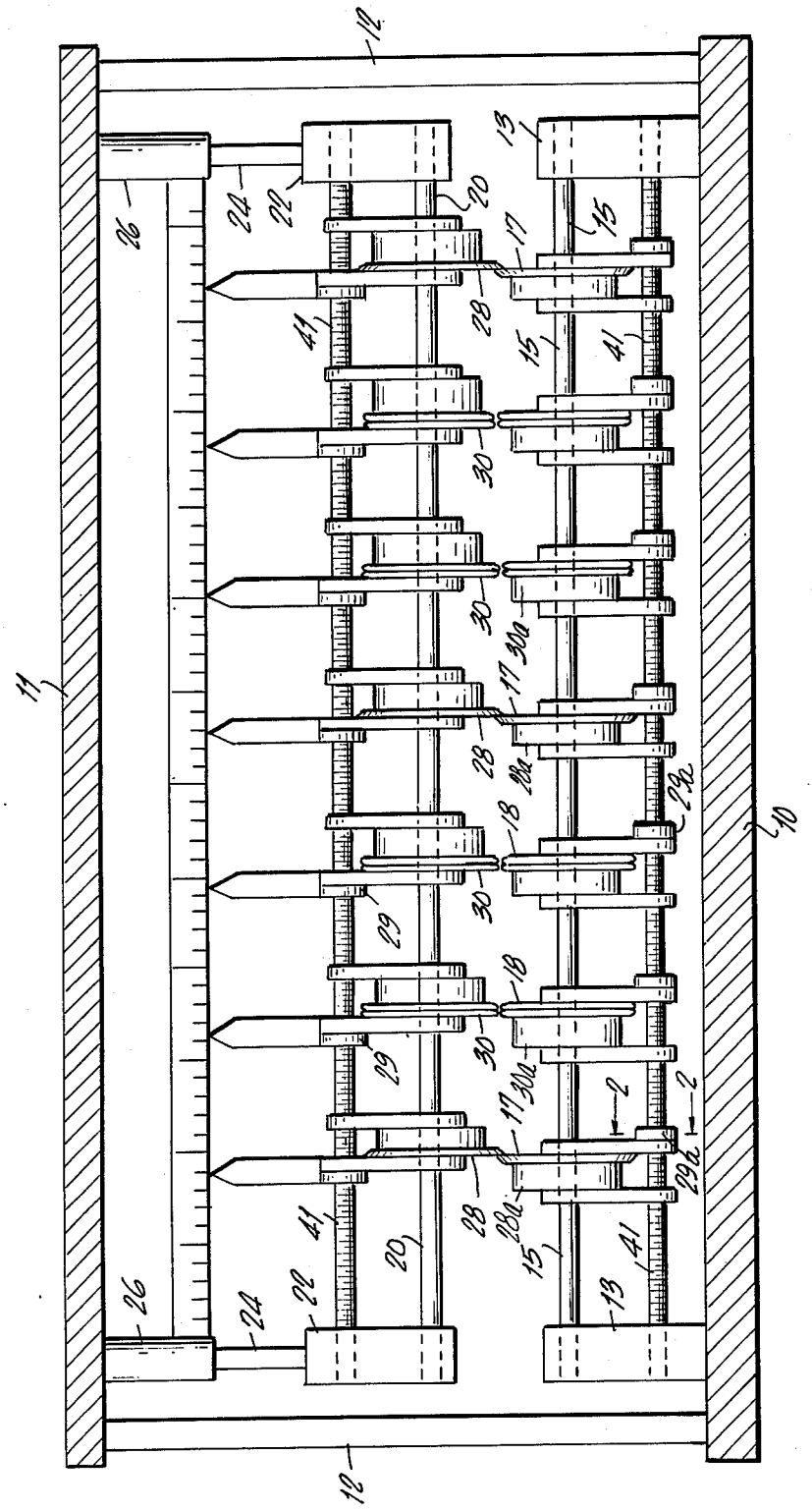
FIG. 5 is a cross sectional view of the machine shown in FIG. 1 and is taken along line 5—5 of that figure looking in the direction of the arrows.

Referring to FIGS. 1 and 5 the slitting and scoring machine is mounted on a base 10 which is part of a frame including a top plate 11 and four upstanding supporting posts 12. The base portion of the machine includes four spaced bearing or yoke plates 13, 14, which rotatably support parallel shafts 15 and 16. Shafts 15, 16 slidably support the lower set of a plurality of assemblies of slitting knives and scoring wheels 17 and 18. Above each shaft 15, 16 a parallel assembly supporting shaft 20, 21 is mounted, rotably held between bearing plates 22, and 23. The bearing plates 22, 23, are each vertically actuated by pistons 24, 25 moving in cylinders 26, 27 secured to the top plate 11. Pistons 24, 25 are operated by compressed air or a liquid under pressure from a fluid reservoir (not shown).

When piston 24 pushes bearing plates 22 and shaft 20 down, a plurality of rotary knives 28 and scoring wheels 30 are moved into contact with an elongated web 31 or corrugated board, pressing the paper 31 between the opposed wheels and knives to either cut it or provide scoring marks to facilitate folding when the board is later made into a container. During this time a web positioning roller 32 is withdrawn from contact with the web. Roller 32 extends for the entire width of the machine normal to and below the path of the web and is moved up to a lifting position by means of a piston 33 moving vertically in a cylinder 34. The position of the roller 32 and piston 33 are controlled by a fluid from a storage reservoir (not shown) in series with a valve.

In FIG. 1, cutter and scoring assembly shafts 15 and 20 are shown in their operating position, slitting and scoring the web as it moves through the machine in the direction indicated by the arrows. The other cutter and scoring assembly shaft 21 is raised out of contact with the paper by operation of the piston 25. In order to free the web 31 from contact with the lower knives 18, a second roller 35 is elevated by means of piston 36 moving vertically in a cylinder 37. Roller 35 is similar to roller 32 and is operated by a fluid from the same reservoir in series with a valve (not shown).

In order to activate the control circuits to operate on either the first or second array of cutters and scoring rollers, a switch 38 is secured to the top plate 11 above bearing plate 22 (FIG. 1) and is normally open when the plate is in its lower position. A similar switch 40 is mounted on the top plate above the bearing plate 23 and is closed when the bearing plate 23 is raised as shown in FIG. 1.

After leaving the area of the second set of cutters and scoring rollers the web 31 may be sent through a cut off knive positioned in compartment 39. This compartment also contains a plurality of solenoid operated slots which are used to deflect the cut pieces and direct them to desired output storage bins (not shown).

Figures 2, 3:
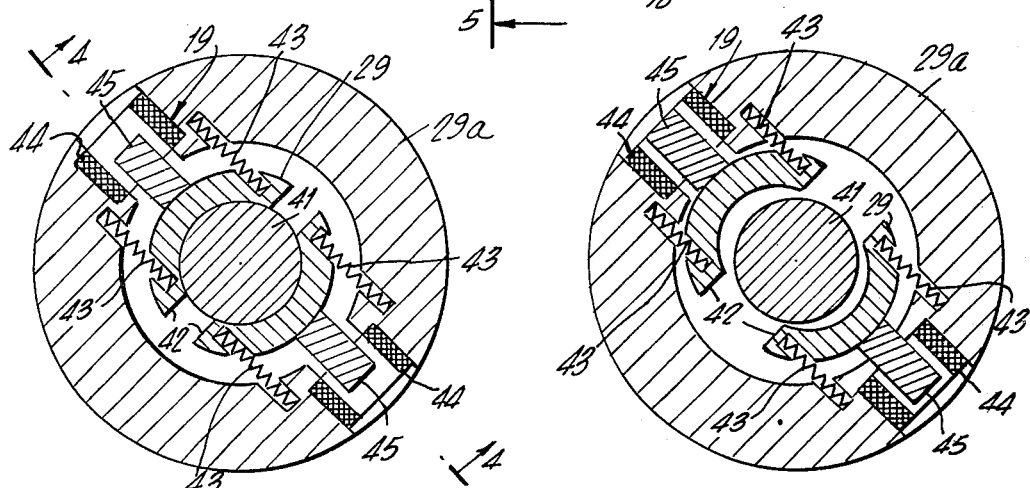
FIG. 2 is a cross sectional view of one of the split nuts with a split meshed with the threaded rod.
FIG. 3 is a view similar to FIG. 2 but showing the split nut disengaged from the threaded rod.
Figure 4:
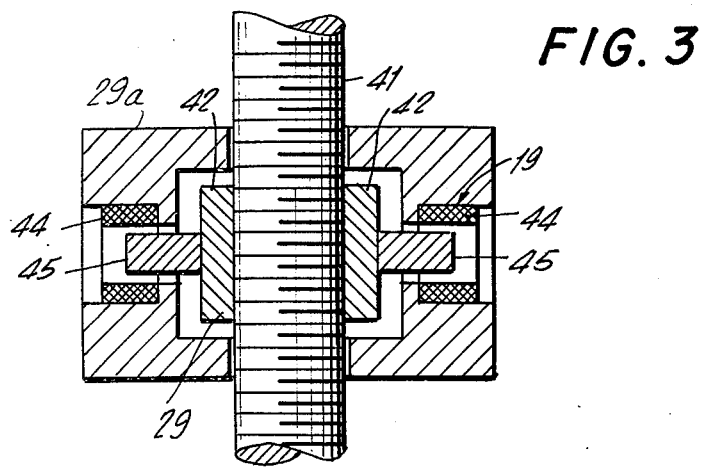
FIG. 4 is a cross sectional view of the threaded rod and nut shown in FIG. 2 and is taken along the line 4—4 of that figure.

FIGS. 2, 3, and 4 show the details of the split nuts 29 and their control solenoids 19. The nuts 29 are mounted on the slitting and scoring assemblies as shown. A threaded shaft 41 driven by a motor (not shown) through suitalbe speed reduction gears is journaled between each of the opposed bearing plates 13, 14, 22, 23. The two halves 42, of the split nut 29 are normally held in mesh with the threaded shaft 41 by four springs 43. The split nuts 42 grip the shaft 41 and, when the shaft is not turning the split nut assembly 29a acts as an anchor and holds the cutting roller or scoring wheel in a desired position. When it is desired to move the cutter or scoring wheel to a new position, all the other split nuts on the same threaded shaft are moved to their disengaged position (see FIG. 3) by sending current through solenoid coils 44 and cores 45 are pulled away from the shaft and the nuts are disengaged from the threads of the shaft 41. The shaft motor is then started and the split nut still in engagement is moved to its new position. By selective engagement, all the nuts are moved to a new position and then the motor is turned off and all the solenoid coils de-energized to lock the assemblies in place. The set of cutters and scoring wheels may now be moved into contact with the web without stopping the machine.

CONTROL CIRCUIT

Figure 6:
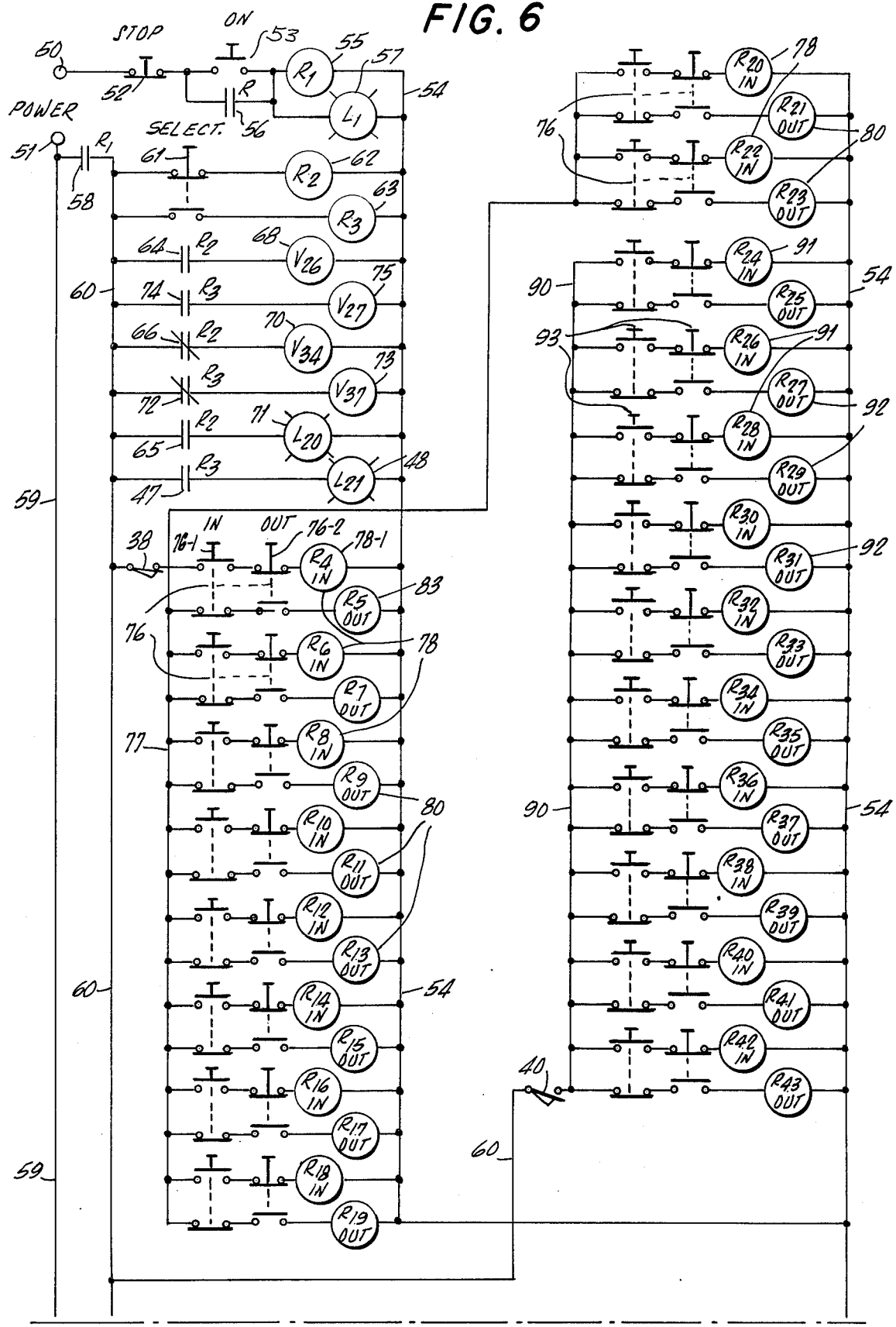
FIGS. 6 and 7 when joined together form a circuit diagram of electrical connections for controlling the machine.
Figure 7:
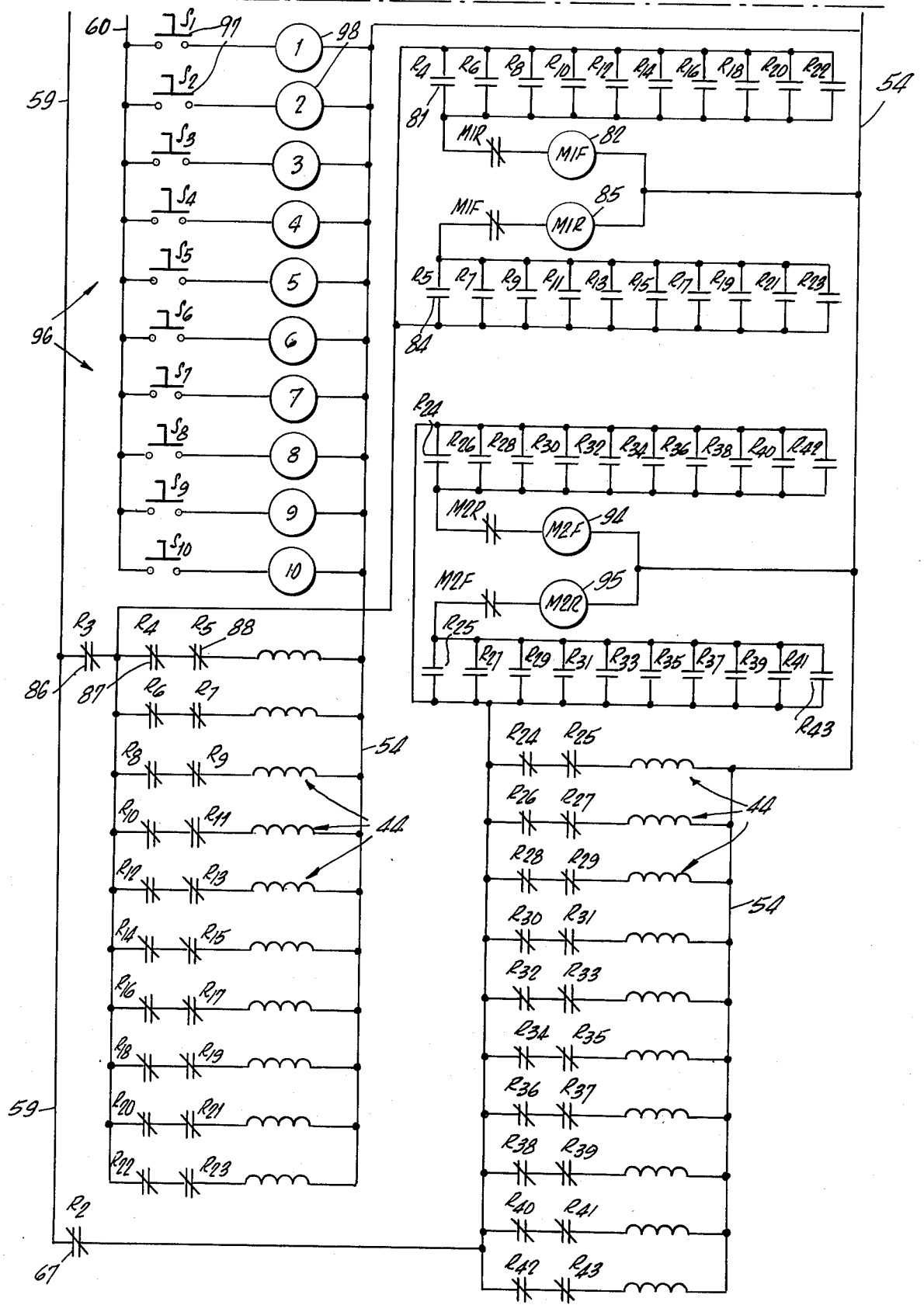

The complete control circuit for the above machine is shown in FIGS. 6 and 7 which are to be joined to show all the components in a working system. Electrical power is applied to input terminals 50, 51 for energizing the relay winding and for operating the solenoid windings 44 coupled to the split nuts 42. A STOP switch 52 and ON switch 53 are connected in series with terminal 50 for controlling the current to a supply conductor 54. A series relay winding 55 in connected in series with the ON switch 53 and conductor 54. A normally open pair of locking contacts 56 is connected around the contact points of the ON switch and closes the contacts. This action locks the contacts in their closed position. A lamp 57 is connected in parallel with the relay winding 55 and shows the operator that the circuit is ready for operation. When relay winding 55 is energized, it also closes contacts 58 to activate conductor 60.

A selector switch 61 is manually operated to connect conductor 60 to either relay winding 62 or 63. Switch 61 is shown in FIG. 6 in its upper position, energizing winding 62 and thereby closing contacts 64 and 65 and opening normally closed contacts 66. This action also opens contacts 67 (see FIG. 7). The closing of contacts 64 sends current to a first solenoid valve 68 to apply compressed air to cylinder 26 (FIG. 1) to move piston 24 down and engage the cutting wheels mounted on bearing plate 22 with the web or sheet 31. The opening of contacts 66 operates a second solenoid valve 70 to cut off the air pressure from cylinder 34 and lower piston 33 from the web 31. When contacts 65 are closed they send current from conductor 60 to a lamp 71 to indicate that the first set of cutting wheels and scoring rollers is in operation. At this time, when relay winding 63 receives no current, its normally closed contacts 72 send current to solenoid valve 73 to raise piston 36 in cylinder 37 and move the web 31 away from the lower half of the second set of cutters and scoring rollers. Contacts 74 on unoperated relay winding 63 remain open and valve 75 remains closed, permitting bearing plate 23 and all the rollers supported by it to remain in its unoperated position as shown in FIG. 1.

With the bearing plate 22 in its disengaged position, the operator is free to move the cutting and scoring wheels into a new set of positions. This is done by manually operating switches 76 which are connected in series between conductors 77 and 54, and also in series with a set of relay windings 78 and 80. Windings 78 operate contacts which control motors to move the wheel assemblies in one direction along the threaded rod 41, while windings 80 operate similar contacts to move the mountings in the reverse direction. As shown in FIG. 6, none of the relay windings 78 or 80 are energized. To move a wheel assembly in one direction, IN switch 76—1 is depressed, sending current to winding 78—1 and closing contacts 81 (see FIG. 7) in series with a first motor 82, turning the threaded shaft 41 to move the split nuts in a first direction. To move the cutting wheel assembly in the reverse direction, the OUT switch 76—2 is depressed, sending current to relay winding 83 and closing contacts 84 (FIG. 7) in series with a second motor 85 turning the threaded shaft in the opposite direction. In FIG. 7, two motors 82 and 85 are shown for clarity. It is obvious that a single motor can be used with reversing windings.

During the time the split nut 42 and its mounting are being adjusted along the threaded shaft 41, all the other split nuts must be disengaged from the shaft. The circuit for controlling this operation is shown in FIG. 7 where a normally closed pair of contacts 86 on relay winding 63 applies current from supply conductor 59 to all the solenoid windings 44 on the first shaft. Each winding is connected in series with two pairs of normally closed contacts and, as long as the relay windings 78 and 80 are unactuated, current flows through all the solenoid windings 44 and the nuts 42 are disengaged from the threaded shaft. When either of the adjusting switches 76—1 or 76—2 are operated, its associated relay is energized and one of the two series contacts 87 or 88 are opened, cutting off current from the solenoid windings and permitting springs 43 to force the split nuts 42 into engagement with the shaft.

The circuit described above indicates how one of the cutter or scoring wheels is adjusted along the width of the machine. To adjust any other of the nine remaining wheels, the operator depresses the corresponding switch 76 to move the split nuts in or out.

When relay winding 63 is actuated by depressing switch 61, contacts 47 are closed, lighting lamp 48, and indicating that current is cut off from the first set of solenoids 44.

When a switch over to a new cutting pattern is made by raising shaft 20 and lowering shaft 21, switch 38 is opened and switch 40 is closed. This action cuts off all electrical power from one set of relays 78 and 80 and applies power to conductor 90 (FIG. 6) whereby another set of relay windings 91 and 92 may be actuated. A similar set of manually operated adjustment switches 93 are used to send power to the desired relay windings to move the cutter wheels in or out as before. The selector switch 61 must be operated when support shaft 20 is up, thereby energizing relay winding 63 and normalizing winding 62. The operation of winding 63 ($R_3$) opens switch contact 86 (FIG. 7) and closes contacts 67 thereby switching the operation to a second control circuit containing motors 94 and 95. Again, the circuits are similar and the operation is the same.

The collating or cut off means 39 shown in FIG. 1 can be used to switch cut pieces of paper or cardboard to several vertical positions. The array of switches 96 shown in FIG. 7 shows one circuit arrangement for this type of operation. Each manually set switch 97 controls current to a solenoid 98 for operating an air line (not shown) to distribute the cut sheets.

The circuit described above includes a large number of relay windings and contacts but it should be noted that the relay controls operate only when the shafts are being moved up or down and when the cutter and scoring wheels are being adjusted along the width of the machine. After the adjustment operation, none of the relays are operating and there is no current sent to the solenoids which operate the split nuts.

We claim:

1. A scoring and slitting machine for a moving web including a first set of upper and lower rotary knives and scoring wheels for scoring and slitting the web; a second set of upper and lower rotary knives and scoring wheels, spaced from the first set for alternate operation on the web for producing an alternate pattern of slits and score marks; the improvement comprising:

a. supporting cross shafts for rotatably mounting each of the sets of slitting knives and scoring wheels;

b. a threaded cross shaft in parallel alignment with each of the supporting cross shafts;

c. a plurality of split nuts coupled to the knives and scoring wheels for selectively engaging the threads on said threaded cross shaft for moving the knives and scoring wheels transversely to predetermined positions when the threaded shaft is rotated and for anchoring the knives and scoring wheels when the threaded shaft is not rotating;

d. means on each of the split nuts for engaging and disengaging the nuts from the threaded shafts;

e. circuit means including a source of potential, for selectively operating the split nut engaging means during a pattern changing operation;

f. and means comprising a manually operable selector switch to energize either a first or second relay winding to raise one of the cross shafts and lower the other cross shaft while the web is moving.

* * * * *